US010355382B2

United States Patent
Sato

(10) Patent No.: US 10,355,382 B2
(45) Date of Patent: Jul. 16, 2019

(54) ELECTRIC CONNECTOR AND MANUFACTURING METHOD OF THE SAME

(71) Applicant: DAI-ICHI SEIKO CO., LTD., Kyoto-shi (JP)

(72) Inventor: Tsukasa Sato, Fukuoka (JP)

(73) Assignee: DAI-ICHI SEIKO CO., LTD., Kyoto-shi (JP)

( * ) Notice: Subject to any disclaimer, the term of this patent is extended or adjusted under 35 U.S.C. 154(b) by 14 days.

(21) Appl. No.: 15/583,233

(22) Filed: May 1, 2017

(65) Prior Publication Data

US 2017/0338576 A1 Nov. 23, 2017

(30) Foreign Application Priority Data

May 18, 2016 (JP) .................................. 2016-099959

(51) Int. Cl.
*H01R 24/60* (2011.01)
*H01R 12/72* (2011.01)
(Continued)

(52) U.S. Cl.
CPC ....... *H01R 12/721* (2013.01); *B29C 45/1671* (2013.01); *H01R 4/184* (2013.01);
(Continued)

(58) Field of Classification Search
CPC ................ H01R 24/60; H01R 2107/00; H01R 13/6581; H01R 13/6585; H01R 13/665;
(Continued)

(56) References Cited

U.S. PATENT DOCUMENTS 6,171,149 B1 * 1/2001 van Zanten ........ H01R 23/6873
439/607.07
8,100,724 B2 * 1/2012 Lin ...................... H01R 12/716
439/218
(Continued)

FOREIGN PATENT DOCUMENTS

CN 1188337 A 7/1998
CN 1134863 C 1/2004
(Continued)

OTHER PUBLICATIONS

Extended European Search Report dated Sep. 28, 2017 in Patent Application No. 17171648.3.
(Continued)

*Primary Examiner* — Truc T Nguyen
(74) *Attorney, Agent, or Firm* — Oblon, McClelland, Maier & Neustadt, L.L.P.

(57) ABSTRACT

By a simple configuration, contact members can be well retained with a housing in a mutually opposed state, and productivity can be improved. When the contact members in the mutually opposed state are to be attached to the housing, a contact retainer prepared by molding in advance is used by disposing the contact retainer in part of the contact opposed region. As a result, the contact members are stably retained in the mutually opposed state even in injection molding molds. Even in a case in which the contact members normally cannot be retained in the mutually opposed state in the injection molding molds, the housing and the contact members can be integrally molded by well retaining the contact members in the mutually opposed state by using the contact retainer and a contact retainer auxiliary and executing an injection molding process.

9 Claims, 13 Drawing Sheets

(51) Int. Cl.
*H01R 4/18* (2006.01)
*H01R 13/436* (2006.01)
*H01R 13/44* (2006.01)
*H01R 13/453* (2006.01)
*B29C 45/16* (2006.01)
*H01R 13/405* (2006.01)
*H01R 13/504* (2006.01)
*H01R 13/6585* (2011.01)
*B29C 45/14* (2006.01)

(52) U.S. Cl.
CPC ....... *H01R 13/405* (2013.01); *H01R 13/4367* (2013.01); *H01R 13/44* (2013.01); *H01R 13/4532* (2013.01); *H01R 13/4538* (2013.01); *H01R 13/504* (2013.01); *H01R 13/6585* (2013.01); *B29C 45/14065* (2013.01); *B29C 45/14639* (2013.01); *B29C 2045/14131* (2013.01); *H01R 24/60* (2013.01)

(58) Field of Classification Search
CPC .............. H01R 12/724; H01R 13/6205; H01R 13/6594; H01R 43/16; H01R 13/405; H01R 24/62; H01R 24/64; H01R 27/02; H01R 43/24
See application file for complete search history.

(56) References Cited

U.S. PATENT DOCUMENTS

| | | | | |
|---|---|---|---|---|
| 8,167,658 B1* | 5/2012 | Liu | ...................... | H01R 12/722 439/630 |
| 8,678,861 B2* | 3/2014 | Little | ................... | G06K 7/0021 439/630 |
| 9,437,989 B2* | 9/2016 | Hsu | ..................... | H01R 13/6585 |
| 9,647,393 B2* | 5/2017 | Tsai | ................... | H01R 13/6581 |
| 9,728,885 B2* | 8/2017 | Yokoyama | ............. | H01R 13/42 |
| 10,096,947 B2* | 10/2018 | Cheng | ................ | H01R 13/6581 |
| 2013/0316556 A1* | 11/2013 | Bertsch | ................ | G06K 7/0026 439/260 |
| 2014/0220827 A1* | 8/2014 | Hsu | ...................... | H01R 12/724 439/629 |
| 2015/0229077 A1 | 8/2015 | Little et al. | | |
| 2016/0099524 A1* | 4/2016 | Hack | .................. | H01R 13/6583 439/607.55 |
| 2017/0040724 A1 | 2/2017 | Little et al. | | |
| 2017/0085037 A1 | 3/2017 | Chen et al. | | |
| 2017/0110817 A1 | 4/2017 | Tsai et al. | | |

FOREIGN PATENT DOCUMENTS

| | | |
|---|---|---|
| CN | 103972732 A | 8/2014 |
| CN | 204304094 U | 4/2015 |
| CN | 105140687 A | 12/2015 |
| CN | 105261870 A | 1/2016 |
| JP | 10-193363 A | 7/1998 |
| JP | 2015-179591 | 10/2015 |
| TW | I509910 B | 11/2015 |

OTHER PUBLICATIONS

Japanese Office Action dated Feb. 13, 2018 in Japanese Patent Application No. 2016-099959, 3 pages.
Combined Chinese Office Action and Search Report dated Dec. 3, 2018 in Chinese Patent Application No. 201710347445.0 (with English translation of Category of Cited Documents), 8 pages.
Combined Office Action and Search Report dated Mar. 20, 2018 in Taiwanese Patent Application No. 106111878 (with English translation of categories of cited documents), 10 pages.

* cited by examiner

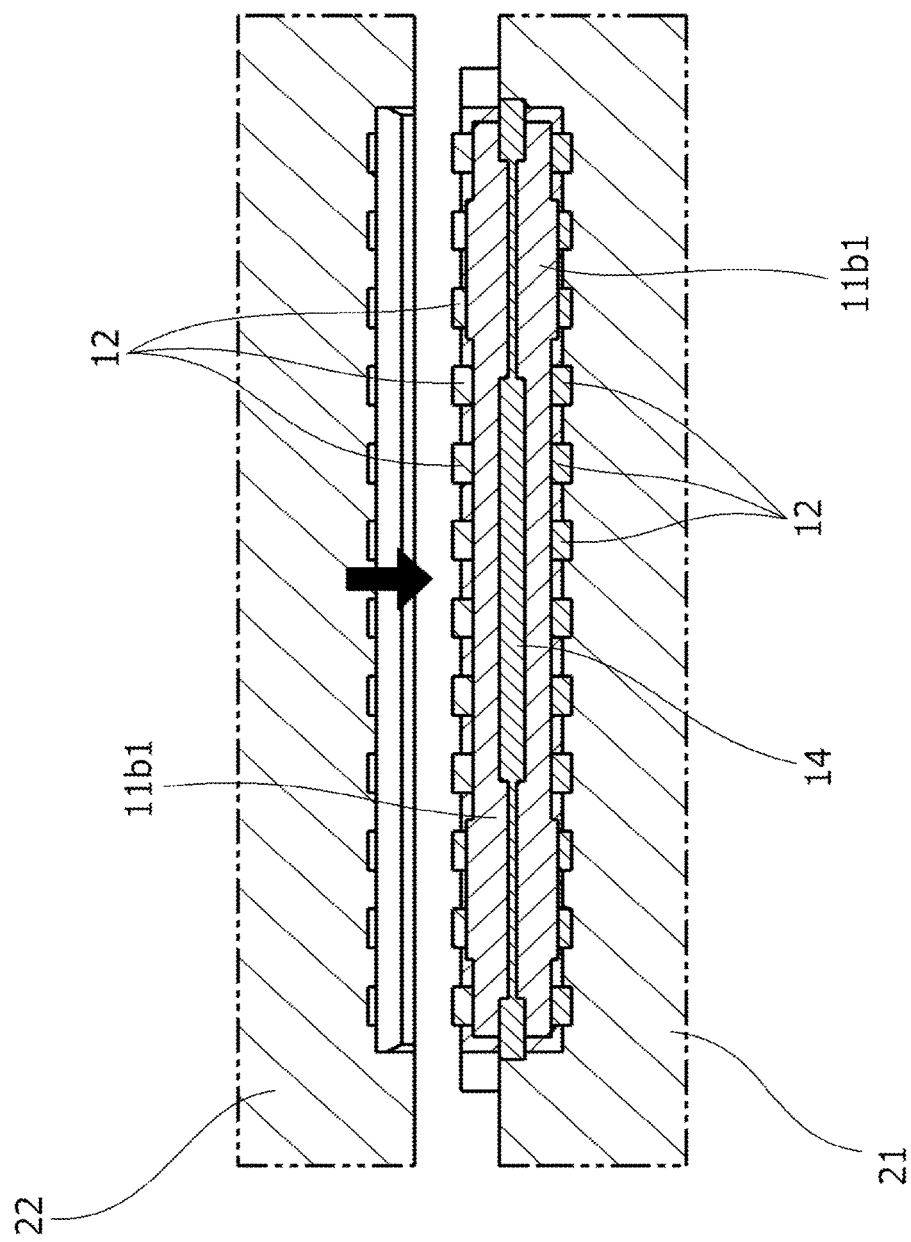

ELECTRIC CONNECTOR AND MANUFACTURING METHOD OF THE SAME

BACKGROUND OF THE INVENTION

Field of the Invention

The present invention relates to an electric connector in which electrically-conductive contact members are attached in a mutually opposed state and relates to a manufacturing method thereof.

Description of Related Art

Electric connectors used in various electronic devices often employ those provided with a structure in which contact members attached to an insulating housing are disposed in a mutually opposed state. For example, in a Universal Serial Bus (USB) connector referred to as a so-called type C, which can be inserted in any of front/back directions, for example, since it has a vertically/horizontally symmetric structure, part of the insulating housing is structured to be disposed in a region between the contact members disposed in a mutually opposed state (contact opposed region). In the insulating housing disposed in the contact opposed region, for example, a mating portion mated with a counterpart connector is formed of a thin flat-plate-shaped member, and the contact members disposed in both sides sandwiching the thin mating portion are buried in a mutually close state in the mating portion as much as the amount of reduction of the thickness of the insulating housing.

When part of the insulating housing is to be disposed in a state in which it abuts the contact members in the region in which the contact members are disposed to be mutually opposed, in other words, in the contact opposed region, for example, it is preferred to integrally form them by insert molding in terms of enhancement of productivity. However, for example, in a case in which the contact members have low rigidity and are easily displaceable or in a case in which the contact opposed region is extremely narrow and long, a case in which the contact members cannot be retained in the mutually opposed state in injection molding molds is conceivable. If the contact members cannot be retained in this manner, the electrode portions of the contacts exposed from the surface of the mating portion may be covered with a molten resin, which forms the housing. Also, the number of processes of insert molding is increased, or a plurality of manufacturing processes are gradually carried out by another formation method; wherein, reduction in productivity may be caused.

The inventors of the present application disclose Japanese Patent Application Laid-Open No. 2015-179591 as a technical document prior to the present invention.

SUMMARY OF THE INVENTION

Therefore, it is an object of the present invention to provide electric connectors capable of well retaining contact members, which are in a mutually opposed state, with a housing and improving productivity and to provide manufacturing methods thereof.

The invention according to a first aspect for achieving the above described object is an electric connector having electrically-conductive contact members disposed in a mutually opposed state and attached to an insulating housing; and a contact retainer formed of part of the housing and retaining the contact member by abutting the contact member, the contact retainer disposed in a contact opposed region in a part between the contact members disposed to be mutually opposed; wherein the contact retainer (s) is disposed in a partial region of the contact opposed region; and, in another region of the contact opposed region, other part of the housing is disposed as a member different from the contact retainer.

According to the invention according to a second aspect, a manufacturing method of an electric connector being a method of attaching electrically-conductive contact members disposed in a mutually opposed state to an insulating housing, the method of disposing a contact retainer, which is formed of part of the housing and retaining the contact members by abutting the contact members, in a contact opposed region in a part between the contact members disposed to be mutually opposed; the method including: when the contact members are to be disposed and attached to the housing in the mutually opposed state, molding the contact retainer with a resin material in advance; retaining the contact members in the mutually opposed state by the contact retainer by disposing the contact retainer molded in advance in part of the contact opposed region; and, then, integrally molding, with a resin material, other part of the contact opposed region, the part other than the contact retainer.

According to the invention according to the first aspect and the second aspect provided with such configurations, when the contact members in the mutually opposed state are attached to the housing, for example, even in a case in which the contact members normally cannot be retained in the mutually opposed state in the injection molding molds, the contact retainer molded in advance is used by being disposed in part of the contact opposed region; as a result, the contact members are well retained in the mutually opposed state, the part other than the contact retainer can be molded by an injection molding process, and the housing and the contact members can be integrally molded. Therefore, productivity is improved.

Herein, according to the invention according to a third aspect, it is desired that the housing have a housing main-body portion and a housing projection portion projecting from the housing main-body portion and mated with a counterpart connector; the contact retainer be disposed in a state that the contact retainer is retaining the contact member at a position corresponding to the housing projection portion; and a surface of the contact retainer retaining the contact member be a flat surface wider than the contact member.

According to the invention according to the third aspect provided with such a configuration, in integral molding of the housing and the contact members, for example, by the injection molding process, when electrode portions of the contact members are retained by the flat surface of the contact retainer, the flat surface of the contact retainer is extending in the vicinities of the electrode portions of the contact members, and a state without recessed/projecting parts is obtained. As a result, even at the part at which the molten resin in the injection molding process does not easily flow like a case in which the surfaces of the electrode portions of the contact members are exposed from the housing, the molten resin smoothly flows along the flat surface in the vicinities of the contact members, and quality and production efficiency of integrated molding of the housing and the contact members are enhanced.

Herein, according to the invention according to a fourth aspect, it is desired that a contact retainer auxiliary retaining the contact member be disposed at a position corresponding to the housing main-body portion in the contact opposed region; and the contact retainer auxiliary be provided with a recessed groove capable of housing the contact member.

According to the invention according to the fourth aspect provided with such a configuration, in the integrated molding of the housing and the contact members by the injection molding process, the contact members are caused to be in a well retained state by the recessed groove shapes of the contact retainer auxiliary. Therefore, when the molten resin flows in the vicinities of the contact members in injection molding, molding is carried out in the state in which the contact members are retained without being dislocated. On the other hand, in the contact main-body portion at this point, the contact members are structured to be covered by the housing. Therefore, the molten resin of the injection molding is in a state in which it easily flows, and the molten resin of the injection molding flows with no trouble even if the contact retainer auxiliary has a recessed groove shape.

Herein, according to the invention according to a fifth aspect, a metal member may be disposed in the contact retainers; and the contact retainers may be disposed respectively on both opposed lateral surfaces of the metal member.

Moreover, herein, according to the invention according to a sixth aspect, the contact retainers disposed respectively on the both opposed lateral surfaces of the metal member are mutually coupled through a through hole provided in the metal member.

Furthermore, according to the invention according to a seventh aspect, the contact members may be arranged in a multipolar shape.

As described above, in the present invention, the contact retainer formed of part of the housing is disposed in partial region of the contact opposed region, and the other part of the housing is configured to be disposed as the member different from the contact retainer in the other region of the contact opposed region. As a result, when the contact members are to be attached in the mutually opposed state to the housing, the contact retainer molded in advance can be disposed in part of the contact opposed region. Therefore, the contact members can be well retained in the mutually opposed state; and, even in a case in which the contact members normally cannot be retained in the mutually opposed state, the part other than the contact retainer can be molded by the injection molding process. As a result, the housing and the contact members can be integrally molded, and productivity can be improved.

BRIEF DESCRIPTION OF THE DRAWINGS

FIGS. 7A and 7B show a manufacturing process of the connector shown in FIG. 1 to FIG. 6; wherein, FIG. 7A is an external perspective explanatory view showing an upper-surface-side part of a ground plate set in a mold, and FIG. 7B is an external perspective explanatory view showing a bottom-surface-side part of the ground plate set in a mold;

FIGS. 8A and 8B show a manufacturing process of the connector shown in FIG. 1 to FIG. 6; wherein, FIG. 8A is an external perspective explanatory view showing the upper-surface-side part in a state in which the contact retainers and the contact retainer auxiliaries are disposed on the ground plate set in the mold, and FIG. 8B is an external perspective explanatory view showing the bottom-surface-side part in the state in which the contact retainers and the contact retainer auxiliaries are disposed on the ground plate set in the mold:

FIGS. 9A and 9B show a manufacturing process of the connector shown in FIG. 1 to FIG. 6; wherein, FIG. 9A is an external perspective explanatory view showing the upper-surface-side part in a state in which the contact members are disposed on the ground plate set, which is set in the mold, via the contact retainers and the contact retainer auxiliaries, and FIG. 9B is an external perspective explanatory view showing the bottom-surface-side part in the state in which the contact members are disposed on the ground plate, which is set in the mold, via the contact retainers and the contact retainer auxiliaries;

FIGS. 10A and 10B show a manufacturing process of the connector shown in FIG. 1 to FIG. 6; wherein, FIG. 10A is an external perspective explanatory view showing the upper-surface-side part in a state in which a housing is molded by carrying out injection molding after the contact members are disposed on the ground plate, which is set in the mold, via the contact retainers and the contact retainer auxiliaries, and FIG. 10B is an external perspective explanatory view showing the bottom-surface-side part in the state in which the housing is molded by carrying out injection molding after the contact members are disposed on the ground plate, which is set in the mold, via the contact retainers and the contact retainer auxiliaries;

FIGS. 11A and 11B show a manufacturing process of the connector shown in FIG. 1 to FIG. 6; wherein, FIG. 11A is an external perspective explanatory view showing the upper-surface-side part in a state in which a shield plate is disposed on the housing, and FIG. 11B is an external perspective explanatory view showing the bottom-surface-side part in the state in which the shield plate is disposed on the housing;

FIG. 12 is a transverse cross-sectional explanatory view showing disposition relations of electrode portions, which are in the state shown in FIGS. 9A and 9B, in molds.

DETAILED DESCRIPTION OF THE PREFERRED EMBODIMENTS

[About Overall Structure of Connector]

Figure 1:
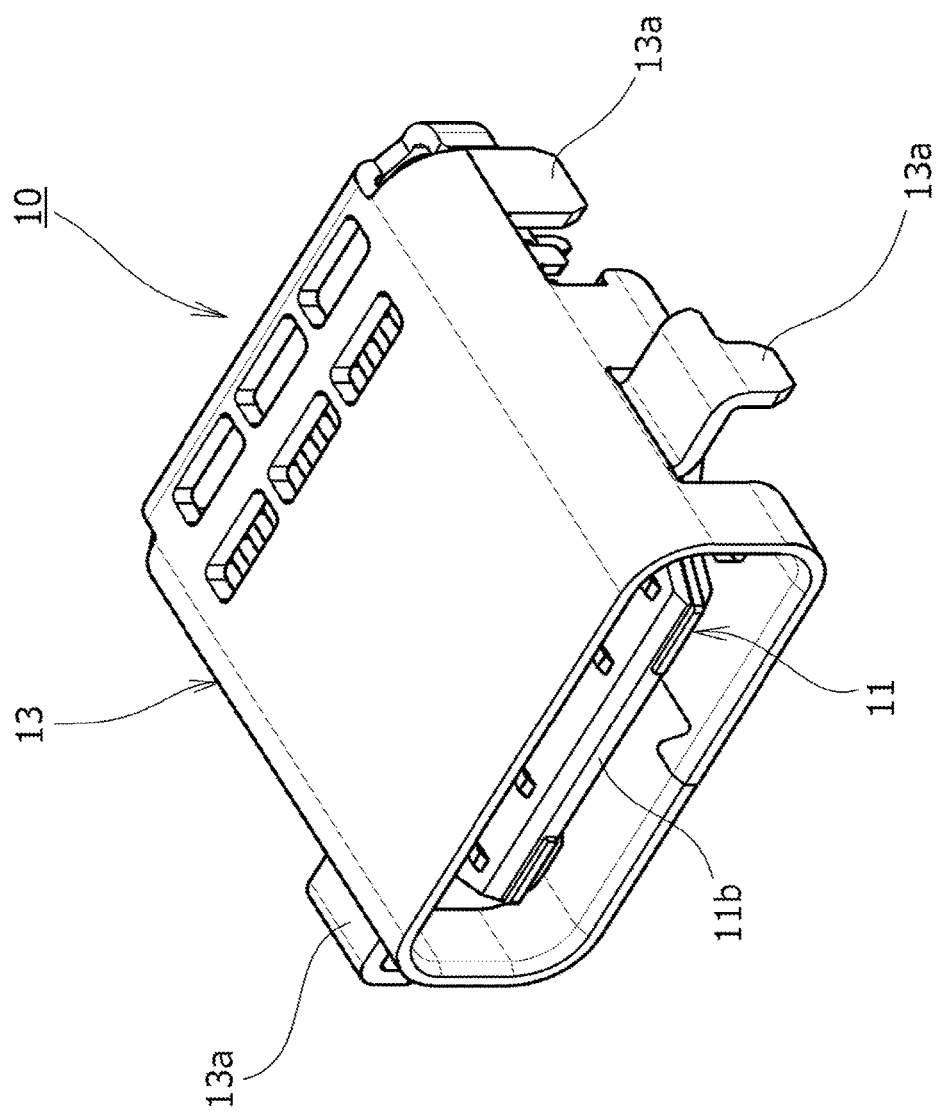
FIG. 1 is an external perspective explanatory view showing a connector according to an embodiment of the present invention from a front-side upper side.
Figure 2:
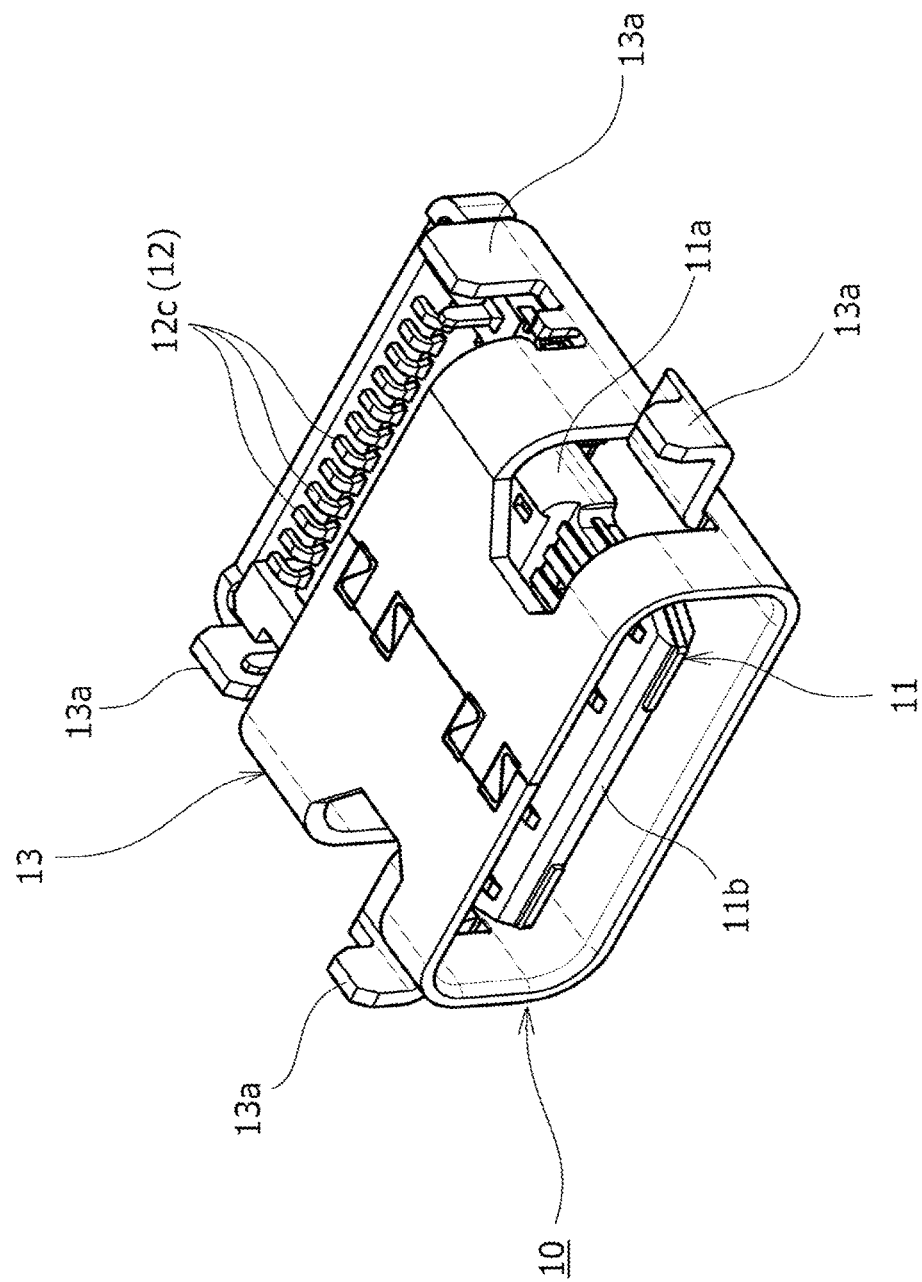
FIG. 2 is an external perspective explanatory view showing the connector shown in FIG. 1 from a front-side lower side.
Figure 3:
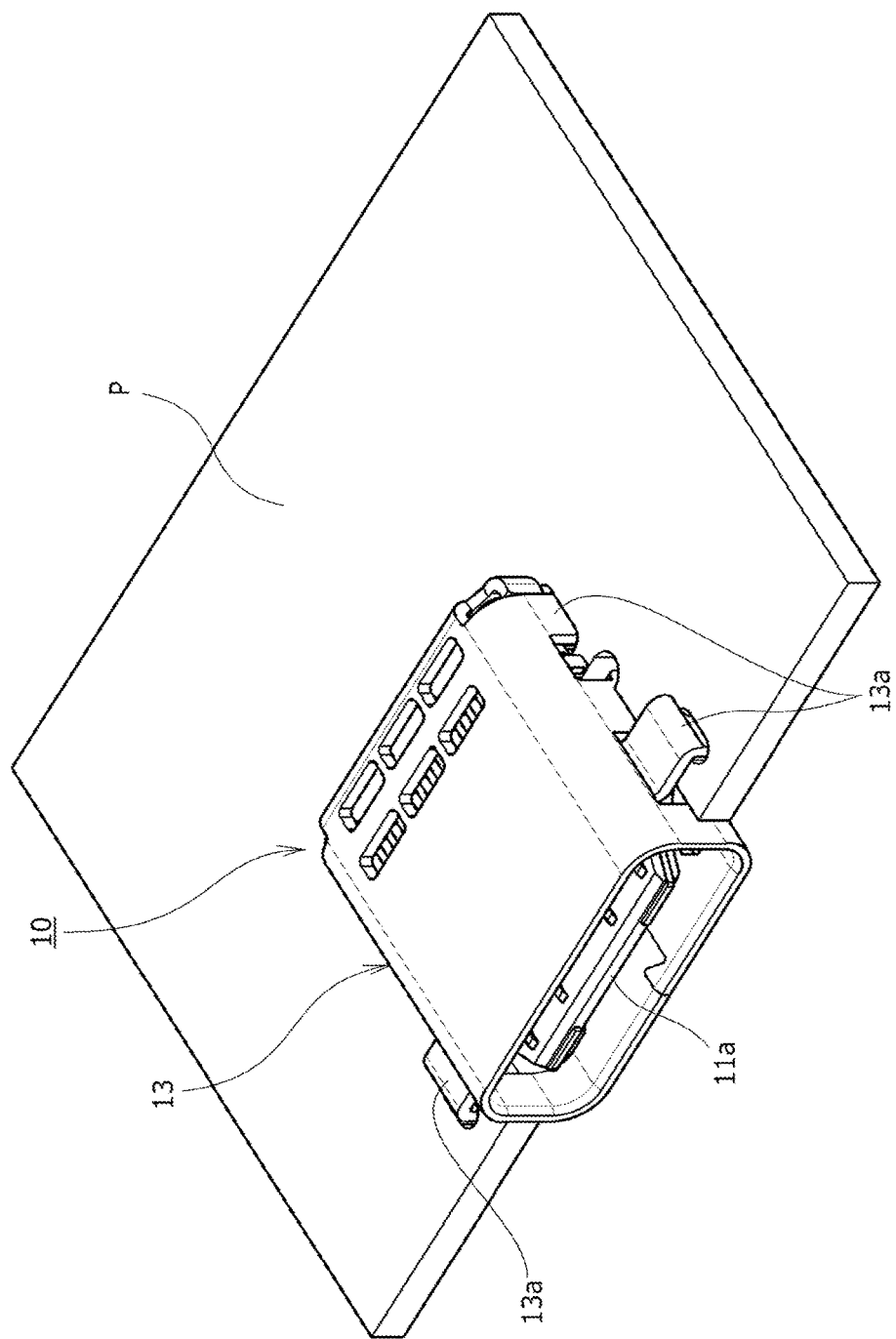
FIG. 3 is an external perspective explanatory view showing a state in which the connector shown in FIG. 1 and FIG. 2 are mounted on a printed wiring board.
Figure 4:
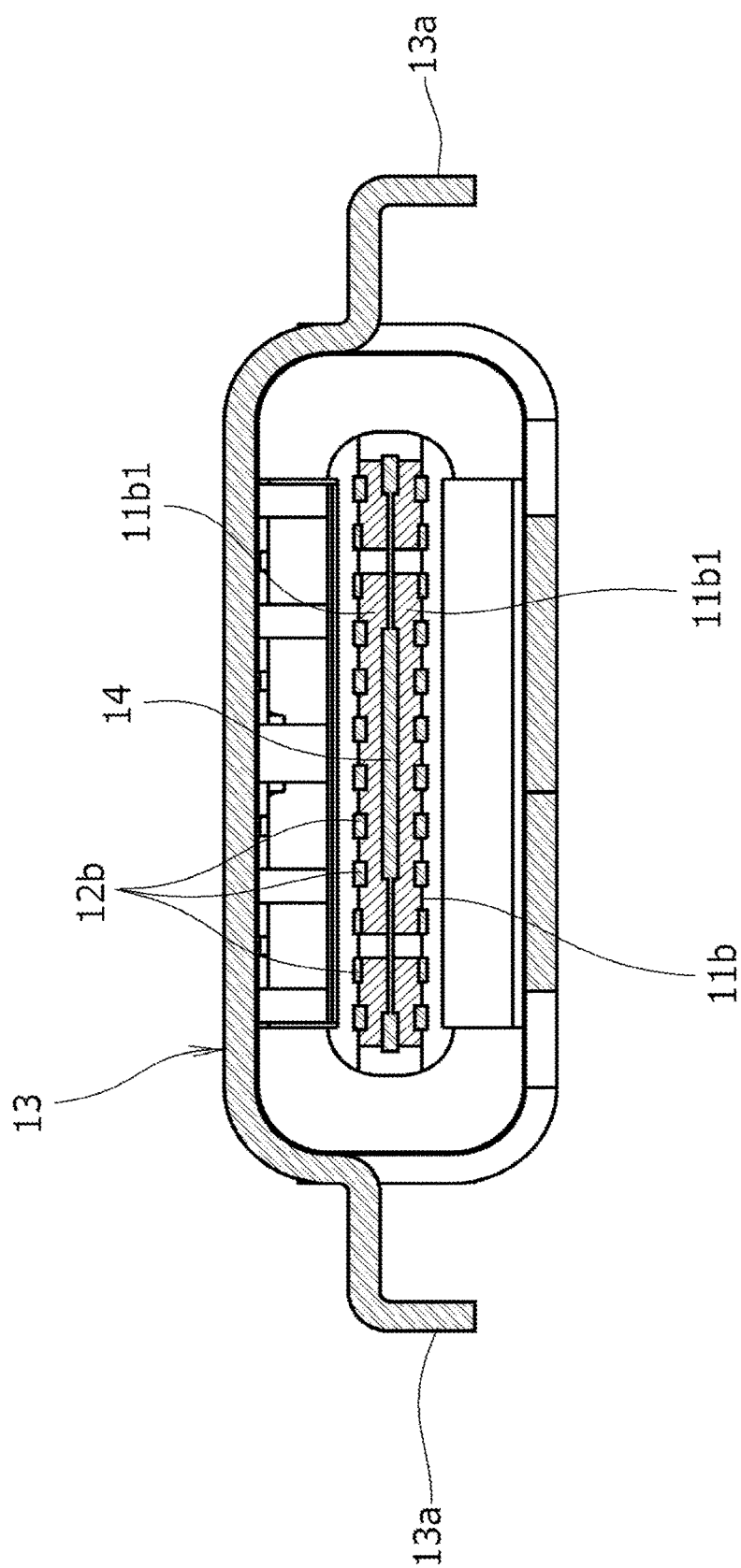
FIG. 4 is a transverse cross-sectional explanatory view of a part in which contact retainers of the connector shown in FIG. 1 to FIG. 3 are disposed.
Figure 5:
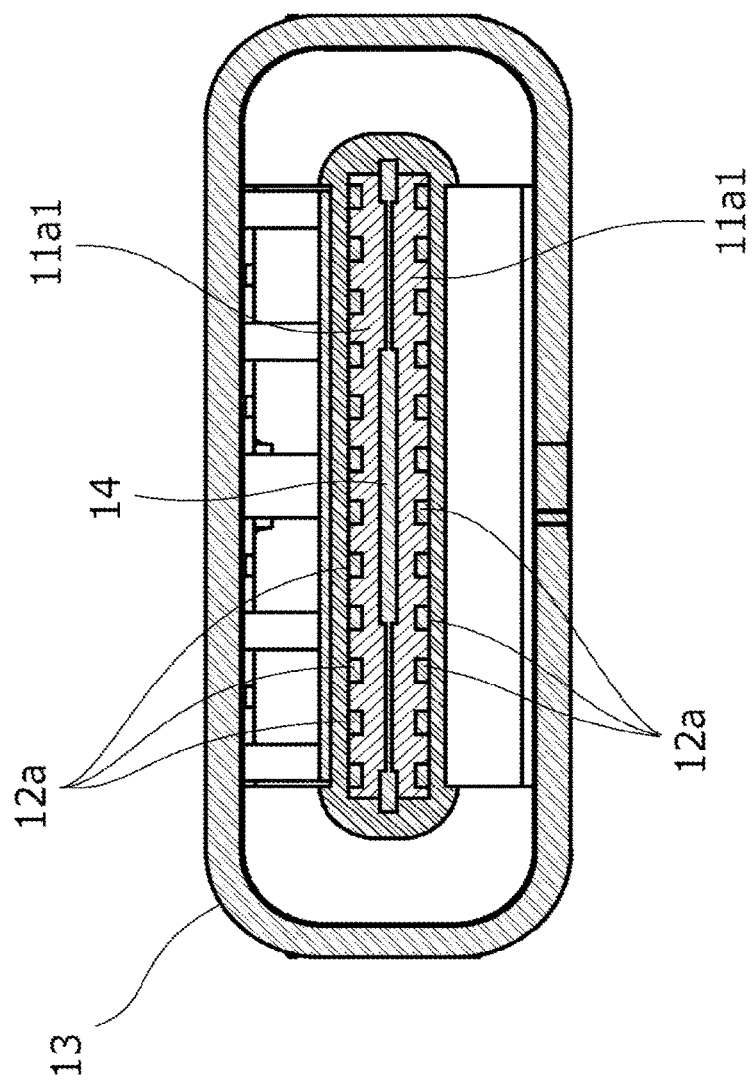
FIG. 5 is a transverse cross-sectional explanatory view of a part in which contact auxiliary retainers of the connector shown in FIG. 1 to FIG. 3 are disposed.

A connector 10 according to an embodiment of the present invention shown in FIG. 1 to FIG. 6 is used by being mounted on a printed wiring board P on which a predetermined electronic circuit is formed, and the connector 10 is provided with, as a core body, a housing 11 formed of a resin material having an insulating property. Contact members 12 formed of belt-shaped metal members are attached to the housing 11 so as to form a multipolar shape, and the housing 11 and the contact members 12 are configured to be covered from an outer side by an electrically-conductive shell 13, which is formed of a hollow tubular metal body.

[About Housing]

The above described housing 11 is provided with a block-shaped housing main-body portion 11a and a flat-plate-shaped housing projection portion 11b, which is projecting from the housing main-body portion 11a; and they are in a disposition relation that the above described housing projection portion 11b is projecting toward "connector front side" from the housing main-body portion 11a, which is disposed in "connector rear side" in the housing 11.

[About Contact Members]

The contact members 12, which are attached to the housing 11, are formed of belt-plate-shaped members which are extending from the above described housing main-body portion 11a to the housing projection portion 11b. Herein, the height direction that perpendicularly gets away from the mounting surface of the printed wiring board P is "upward direction", and the direction that is opposite thereto and gets closer to the mounting surface of the printed wiring board P is "downward direction"; wherein, the above described contact members 12 are in a disposition relation that the contact members 12 in two levels are mutually opposed so as to be overlapped with each other in the upward-downward direction.

The plurality of contact members 12 which are arranged in each of the levels are forming a group in which the contact members are arranged in a multipolar shape with predetermined intervals therebetween, and the contact members 12 forming the groups are disposed to be mutually opposed in the upward-downward direction. The arrangement direction of the multipolar shape of the contact members 12 like this will be referred to as "multipole-arrangement direction" or "connector-width direction" hereinafter.

Each of the contact members 12, which are disposed in the two levels as described above, is provided with a contact base portion 12a disposed in the "connector rear side" and an electrode portion 12b projecting from the contact base portion 12a toward the "connector front side", and the contact base portion 12a among them is disposed in a state in which the contact base portion is buried in the above described housing main-body portion 11a. On the other hand, the electrode portion 12b of the contact member 12 is projecting from the housing main-body portion 11a toward the "connector front side" and is disposed in a state in which the electrode portion is exposed to the outer side from the front/back (top/bottom) both surfaces of the housing projection portion 11b, which forms the flat plate shape as described above.

The contact base portion 12a, which is integrally coupled to the electrode portion 12b of each of the contact members 12, is extending from the electrode portion 12b toward the "connector rear side" in the direction horizontal to the mounting surface of the printed wiring board P (hereinafter, simply referred to as "horizontal direction") in the housing main-body portion 11a, is approximately horizontally extending again via a step-shaped portion, which is extending to the obliquely upper side toward the "connector rear side" in the housing main-body portion 11a, is then bent approximately perpendicularly downward along a rear end surface of the housing main-body portion 11a, and is extending toward the outer side (lower side) of the housing main-body portion 11a.

The outer-side extending part of the contact base portion 12a like this in the "connector rear side" is once projecting to the lower side from the rear end surface of the housing main-body portion 11a, and is then formed into a board connecting portion 12c, which is approximately horizontally bent and extending. The board connecting portions 12c thereof are configured to be connected to signal transmission paths or ground electrically-conductive paths on the printed wiring board P, thereby forming signal circuits or ground circuits.

[About Electrically-Conductive Shell]

On the other hand, the above described electrically-conductive shell 13 is formed of the hollow tubular member covering the entirety of the housing 11 and the contact members 12 from the outer side, and both end portions thereof in the "connector front-rear direction" are respectively provided with openings which are wide in the "connector width direction". Both of the openings are configured to be in an open state toward the "connector front side" and the "connector rear side", respectively.

The above described housing projection portion 11b and the electrode portions 12b of the contact members 12 are in a state in which they are exposed toward the "connector front side" through the front-end-side opening of the electrically-conductive shell 13, and, for example, a plug connector (illustration omitted) or the like serving as a mating counterpart is configured to be inserted to an inner region of the front-end-side opening of the electrically-conductive shell 13.

Both lateral wall portions of the electrically-conductive shell 13 like this in the "connector width direction" are provided with a pair of ground connecting plates 13a and 13a, which form plate shapes and are extending approximately horizontally, so that they bulge toward the outer side in the "connector width direction". The ground connecting plates 13a and 13a are solder-connected to the ground electrically-conductive paths on the printed wiring boards P, thereby forming the ground circuits.

[About Ground Plate]

Figure 7A:
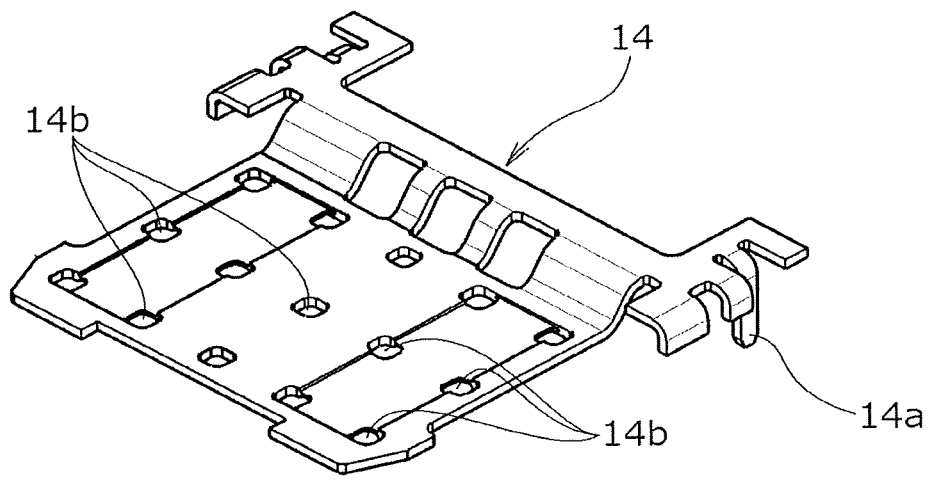
Figure 7B:
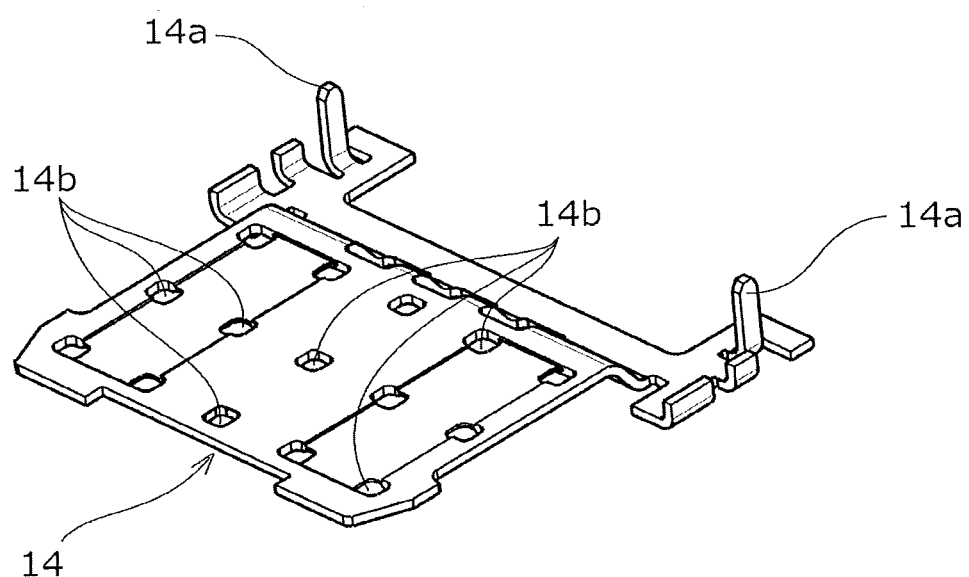

On the other hand, in the above described housing 11, a ground plate 14 formed of a flat-plate-shaped metal member as shown in FIGS. 7A and 7B is disposed in a buried state. The ground plate 14 is extending from the housing main-body portion 11a to the housing projection portion 11b of the above described housing 11 via a downward-slope step portion and is extending across the entire range of the region in which the above described contact members 12 are arranged in the multipolar shape. The contact members 12 are disposed in the upper/lower two levels along the front/back (top/bottom) both surfaces of the ground plate 14.

On the "connector-width-direction" both lateral portions of the ground plate 14 in the "connector rear end side", a pair of ground connecting pieces 14a and 14a, which form bent plate shapes, are formed as tongue pieces from the "connector-width-direction" both lateral portions toward the lower side. Each of the ground connecting pieces 14a is solder-connected to a ground electrically-conductive path on the printed wiring board P, thereby forming a ground circuit.

As described above, in the region of the "connector front side" of the ground plate 14, a flat-surface-shaped part is extending, a plurality of through holes 14b are formed in the flat-surface-shaped part, and part of the housing 11 is disposed so as to fill the interiors of the through holes 14b as described later.

Figure 6:
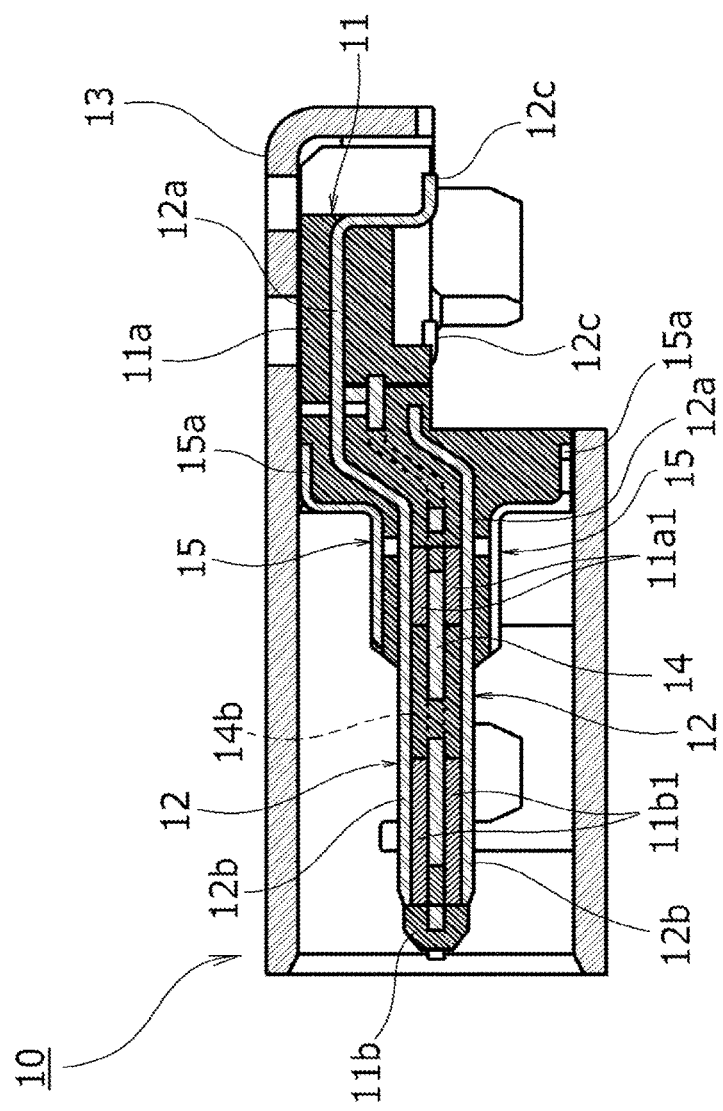
FIG. 6 is a vertical cross-sectional explanatory view of a part in which a contact member in the connector shown in FIG. 1 to FIG. 5 is disposed.
Figure 11A:
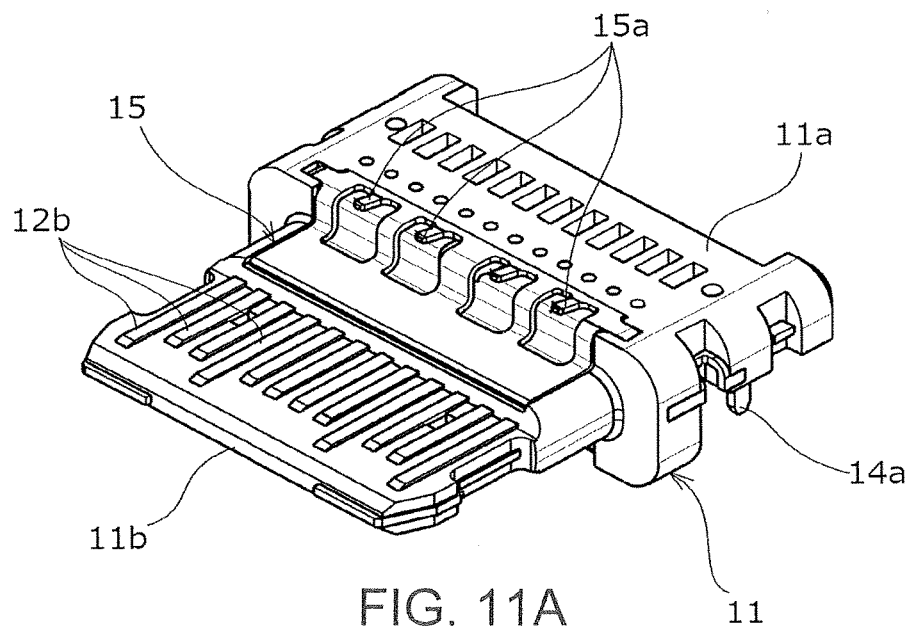
Figure 11B:
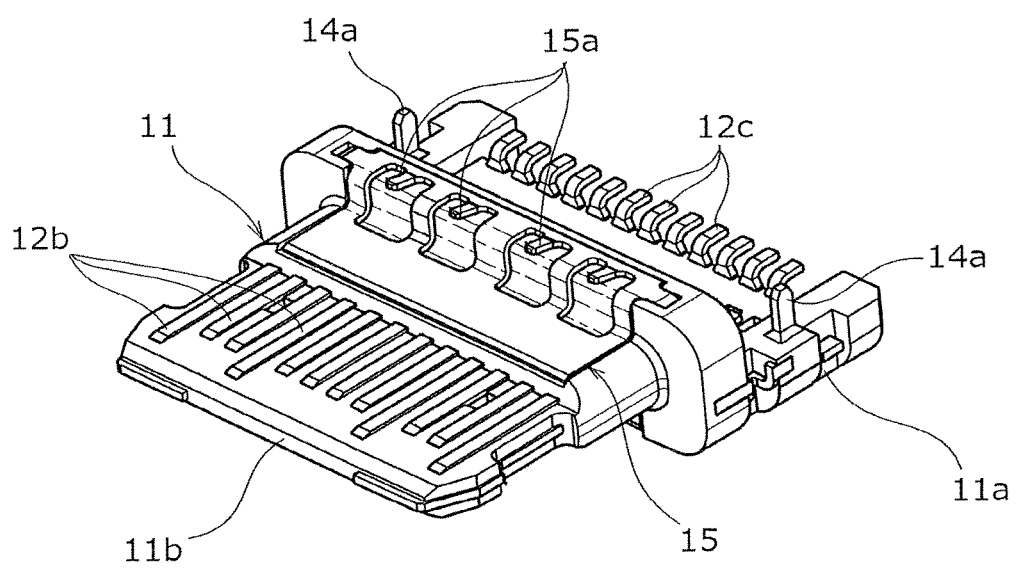

As shown in FIG. 6 and FIGS. 11A and 11B, shield plates 15 and 15, which are formed of metal plate materials contacting inner wall surfaces of the electrically-conductive shell 13, are disposed, respectively, on the upper surface and the lower surface of the above described housing 11. Each of the shield plates 15 is extending from the housing main-body portion 11a to the housing projection portion 11b via a step portion, which is formed by approximately perpendicularly bending, and is disposed so as to cover, together with the housing 11, the upper part and the lower part of the region in which the above described contact members 12 are arranged in the multipolar shape, thereby providing a function to carry out shielding of transmission signals.

A plurality of ground connecting pieces 15a, which form tongue piece shapes, are provided in the part at which the shield plates 15 cover the housing main-body portion 11a, and the ground connecting pieces 15a are in contact with the inner wall surfaces of the electrically-conductive shell 13, thereby forming ground circuits.

[About Structure of Opposed Region of Contact Members]

Herein, the upper/lower contact members 12 and 12, which are disposed in the two levels as described above, are disposed to be mutually opposed in the state in which they are vertically close to each other with the ground plate 14 and the housing 11 sandwiched therebetween, and part of the housing projection portion 11b and the housing main-body portion 11a of the housing 11 is disposed in the contact opposed region, which is formed in a thin shape in the part between the upper/lower contact members 12 and 12. The part of the housing projection portion 11b and the housing main-body portion 11a of the housing 11, which is disposed in the contact opposed region, is abutting the ground plate 14 and is disposed in the state in which the part is abutting the contact members 12.

More specifically, the housing projection portion 11b of the housing 11 disposed in the region of the "connector front side", which is part of the contact opposed region, is abutting the electrode portions 12b of the contact members 12, and the housing main-body portion 11a of the housing 11 disposed in the region of the "connector rear side", which is another part of the contact opposed region, is abutting the contact base portions 12a and 12a of the contact members 12. As described next, in manufacturing of the housing 11, contact retainers 11b1, which form part of the housing projection portion 11b, retain the electrode portions 12b of the contact members 12, and contact auxiliary retainers 11a1, which form part of the housing main-body portion 11a, are caused to be in the state in which the contact auxiliary retainers retain the contact base portion 12a of the contact member 12.

More specifically, the contact retainers 11b1, which form part of the above described housing projection portion 11b, and the contact retainer auxiliaries 11a1, which form part of the housing main-body portion 11a, are formed of thin-plate-shaped resin members which are differently separated and disposed in the "connector front-rear direction" in the contact opposed region. With respect to the flat-surface-shaped part of the above described ground plate 14, the contact retainers 11b1 are disposed in the "connector front side", and the contact retainer auxiliaries 11a1 are disposed as different resin members in the "connector rear side".

In another region in the contact opposed region in the part between the contact retainers 11b1 and the contact retainer auxiliaries 11a1, a resin material constituting a different part of the housing 11 is disposed so as to fill this region by later-described insert molding. This filled part composed of the different part of the housing 11 is formed of a member which is different from the contact retainers 11b1 and the contact retainer auxiliaries 11a1 as a basic configuration. The contact retainer 11b1 and the contact retainer auxiliary 11a1 are disposed on each of the both opposing lateral surfaces of the ground plate 14. Through the through holes 14b provided in the ground plate 14, the contact retainers 11b1 are coupled to each other, and the contact retainer auxiliaries 11a1 are coupled to each other.

Figure 8A:
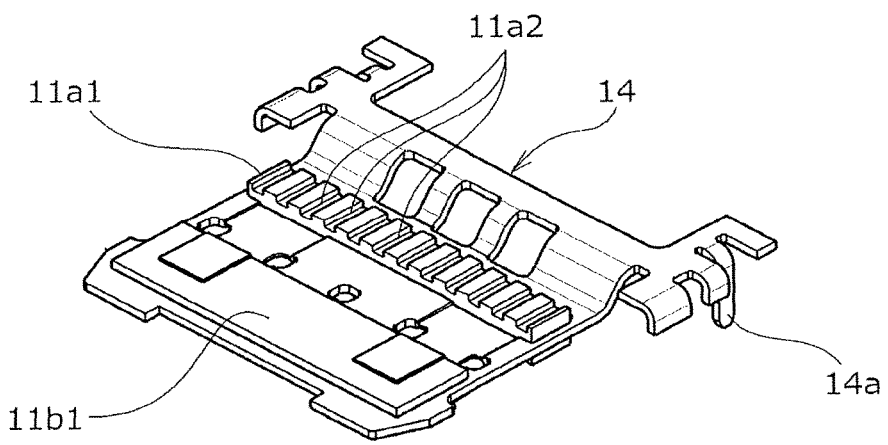
Figure 8B:
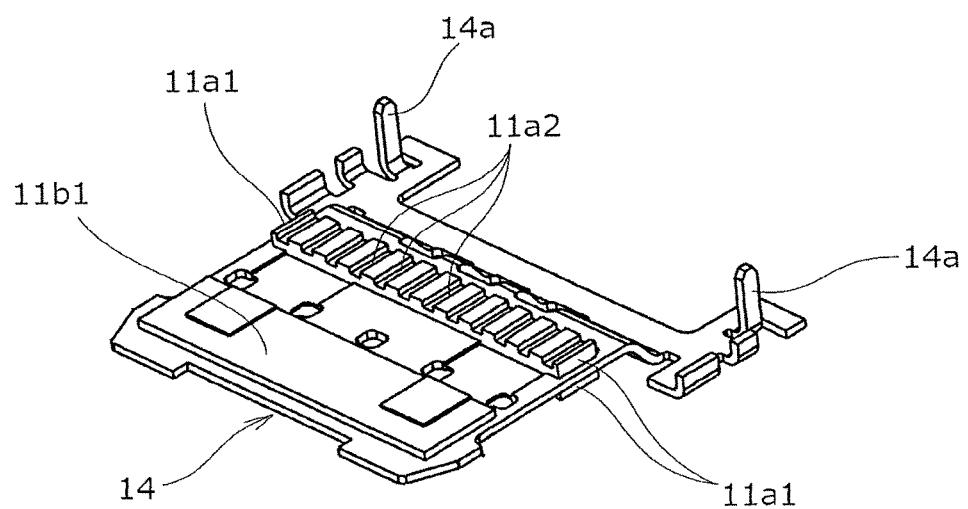

Herein, the above described contact retainers 11b1 and the contact retainer auxiliaries 11a1 are extending in the "connector width direction" across the entire range of the multipolar arrangement region of the above described contact members 12 as shown in FIGS. 8A and 8B; wherein, the contact retainers 11b1 disposed in the "connector front side" are formed of thin resin members forming flat plate shapes, and the contact retainer auxiliaries 11a1 disposed in the "connector rear side" are formed of thin resin members having recessed/projecting shapes on the surfaces thereof.

More specifically, the surface of the contact retainer 11b1 that abuts the contact members 12 is formed so as to form a flat surface shape, and the flat surface of the contact retainer 11b1 retaining the contact members 12 are formed into the flat surface which is wider than the width of the contact members 12. In other words, the flat surface of the contact retainer 11b1 is only required to extend to the width-direction outer side of the contact members 12, and a recessed portion, etc. narrower than the width of the contact members 12 may be provided on part of the flat surface of the contact retainer 11b1. On the other hand, the surface of the contact retainer auxiliary 11a1 that abuts the contact members 12 is provided with recessed grooves 11a2 which are capable of housing the contact members 12 and extending along the "connector front-rear direction".

Figure 9A:
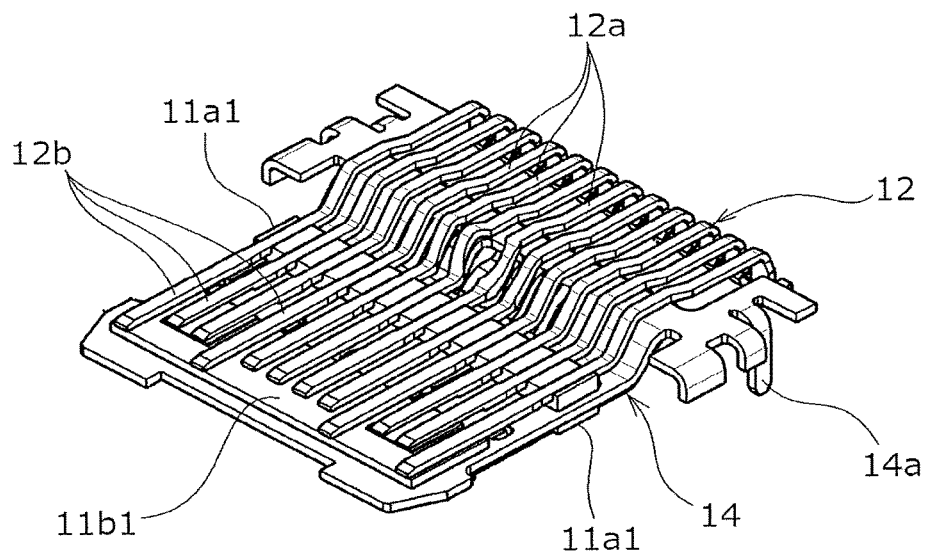
Figure 9B:
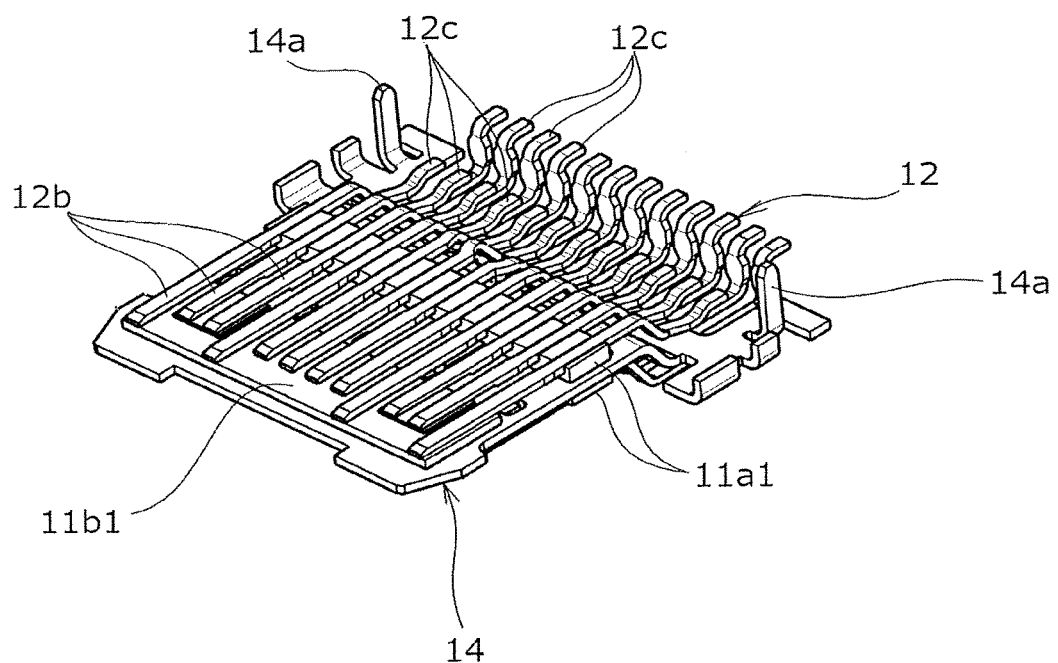

The electrode portions 12b of the contact members 12 are retained in a placed state with respect to the surface of the contact retainer 11b1, which forms the flat surface shape as described above, and the contact base portions 12a of the contact members 12 are housed in the recessed grooves of the contact retainer auxiliary 11a1 (see FIGS. 9A and 9B). More specifically, the recessed grooves 11a2 of the contact retainer auxiliary 11a1 are formed in a juxtaposed state in which the recessed grooves match the arrangement pitch of the contact members 12 in the "connector width direction", the contact base portions 12a of the contact members 12 are housed in the recessed grooves 11a2 of the contact retainer auxiliary 11a1, and, as a result, the contact members 12 are retained in a state in which they are positioned in the "connector width direction".

[About Manufacturing Process]

In the state in which the contact members 12 are retained by the contact retainers 11b1 and the contact auxiliary retainers 11a1 in this manner, an insert molding method using injection molding molds is suitably employed.

More specifically, first, the ground plate 14 shown in FIGS. 7A and 7B are set in the injection molding molds (illustration omitted); and, in this process, as shown in FIGS. 8A and 8B, the contact retainers 11b1 and the contact retainer auxiliaries 11a1, which are separately prepared in advance, are set on the front/back surfaces (top/bottom surfaces) of the flat-surface-shaped part of the ground plate 14 in the "connector front side" so as to abut the surfaces of the ground plate 14. The positions at which the contact retainers 11b1 and the contact retainer auxiliaries 11a1 are disposed will be part of the contact opposed region, in which the contact members 12 and 12 of the upper/lower two levels are disposed to be mutually opposed, in the end.

Then, the contact members 12 are set so as to be placed on the above described contact retainers 11b1 and the contact retainer auxiliaries 11a1. In this process, the contact members 12 are disposed in the state in which they are positioned in the direction of multipolar arrangement by the recessed grooves provided in the contact retainer auxiliaries 11a1, and, as a result, the contact members 12 and 12 of the upper/lower two levels are easily precisely retained in the state in which they are closely mutually opposed via the contact retainers 11b1 and the contact retainer auxiliaries 11a1. In this process, even in a case in which the contact retainer auxiliaries 11a1 are not disposed, the contact members 12 are retained by the contact retainers 11b1 so as to format least the contact opposed region. Therefore, for example as shown by an arrow in FIG. 12, when an upper mold 22 is to be clamped with respect to a lower mold 21, a situation in which the upper mold 22 bite the contact members 12 does not occur.

Figure 10A:
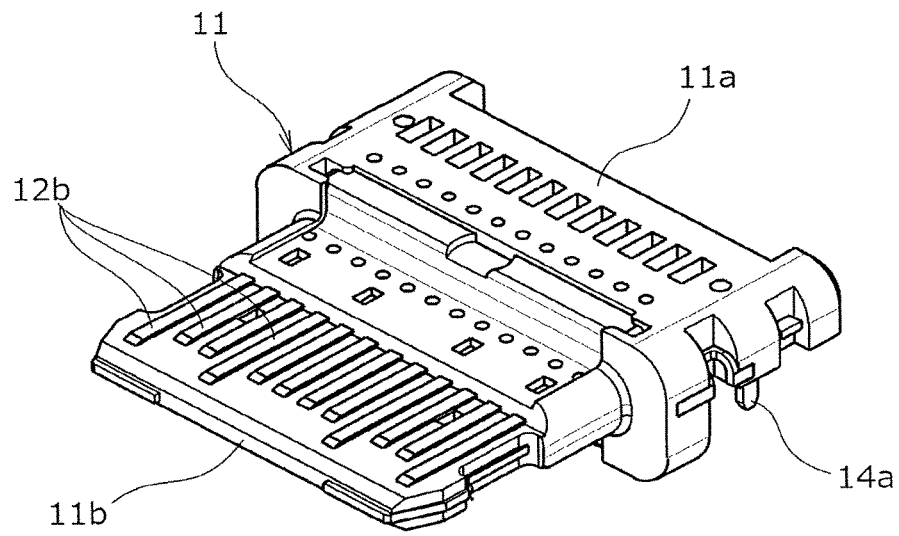
Figure 10B:
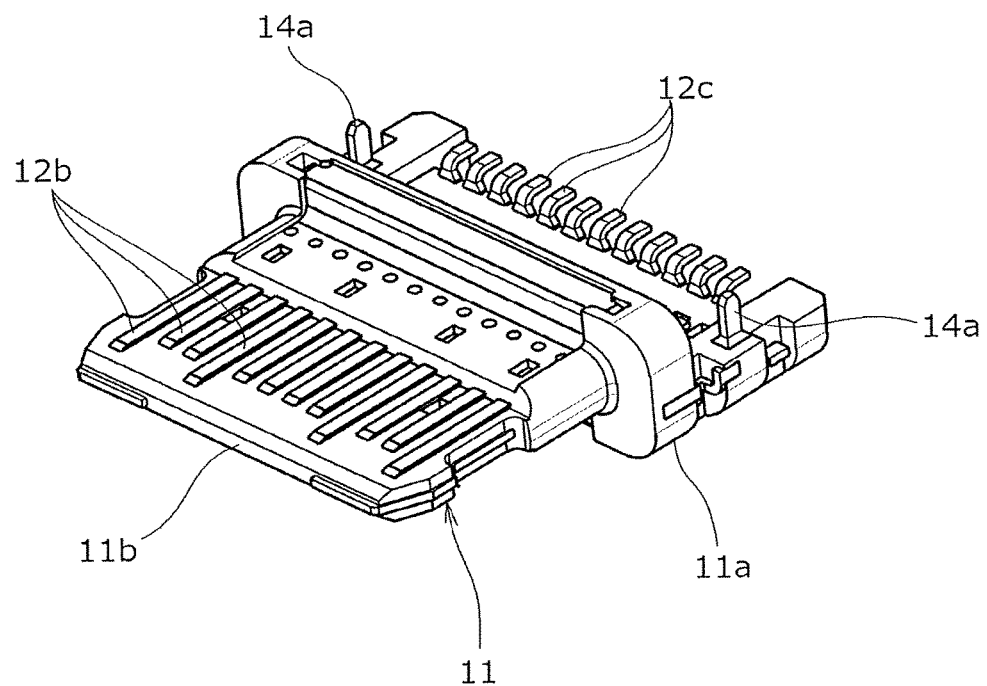

When a resin material is subjected to injection molding in the state in which the contact members 12 and 12 in the upper/lower two levels are retained by the contact retainers 11b1 and the contact retainer auxiliaries 11a1 in this manner, integrated insert molding is carried out well, and, as shown in FIGS. 10A and 10B, the housing 11 is formed. When such integrated insert molding is carried out, regarding the contact opposed region in which the contact members 12 and 12 in the upper/lower two levels are disposed to be mutually opposed, the part other than the contact retainers 11b1 and the contact retainer auxiliaries 11a1 is integrally molded so as to be filled with resin.

Meanwhile, regarding the injection molding state about the housing main-body portion 11a of the housing 11, since the housing main-body portion 11a has a block shape, the molten resin material discharged flows well without any problem. On the other hand, regarding the housing projection portion 11b, which is formed to cause the electrode portions 12b forming thin shapes to be in an exposed state, since the molten resin material discharged does not easily flow, whether a sufficient resin material is supplied to the parts between the electrode portions 12b of the contact members 12 or not is an important problem for success/failure of molding.

With respect to such a situation in which molding is difficult, in the present embodiment, the electrode portions 12b of the contact members 12 are in the state in which they are retained by the flat surface parts of the contact retainers 11b1. Therefore, the vicinities of the electrode portions 12b of the contact members 12 are in the state in which the flat surfaces of the contact retainers 11b1 are extending without recessed/projecting parts. As a result, even at the part at which the molten resin does not easily flow in the injection molding process like the case in which the surfaces of the electrode portions 12b of the contact members 12 forming the thin shapes are exposed from the housing 11, the molten resin smoothly flows along the flat surface in the vicinities of the contact members 12.

As shown in FIGS. 11A and 11B, the shield plate 15 is attached onto the surface of the housing 11, which has been molded through such injection molding.

As described above, in the present embodiment, when the contact members 12 and 12 are attached to the housing 11 in the state in which they are mutually opposed, the contact retainers 11b1 and the contact retainer auxiliaries 11a1 prepared by molding in advance are disposed in part of the contact opposed region, and, as a result, the contact members 12 and 12 are retained in the state in which they are stably mutually opposed in the injection molding molds. Therefore, for example, even in a case in which contact members normally cannot be retained in the state in which they are disposed to be mutually opposed in injection molding molds, the contact members can be retained well in the mutually opposed state by using the contact retainers 11b1 and the contact retainer auxiliaries 11a1, and the housing 11 and the contact members 12 can be integrally molded by molding the part other than the contact retainers 11b1 and the contact retainer auxiliaries 11a1 by the injection molding process; therefore, productivity is improved.

Particularly, in the present embodiment, when the housing 11 and the contact members 12 are to be integrally molded by the injection molding process, the electrode portions 12b of the contact members 12 are caused to be in the state in which they are retained by the flat surfaces of the contact retainers 11b1 as described above; therefore, the molten resin smoothly flows along the flat surfaces in the vicinities of the contact members 12, and the quality and production efficiency of the integrated molding of the housing 11 and the contact members 12 are enhanced with the electrode portions 12b not covered with the molten resin.

Furthermore, in the present embodiment, when the housing 11 and the contact members 12 are to be integrally molded by the injection molding process, the contact members 12 are caused to be in the well retained state by the recessed grooves 11a2 of the contact retainer auxiliaries 11a1; therefore, when the molten resin flows in the vicinities of the contact members in injection molding, the molding is carried out in the state in which the contact members 12 are retained without being dislocated in the connector-width direction. On the other hand, at the contact main-body portions 12a of the housing 11, the contact members 12 are structured to be covered with the housing 11; therefore, they are in the state in which the molten resin of the injection molding easily flows, and the molten resin of the injection molding flows with no trouble even if the contact retainer auxiliaries 11a1 have recessed groove shapes.

Figure 13:
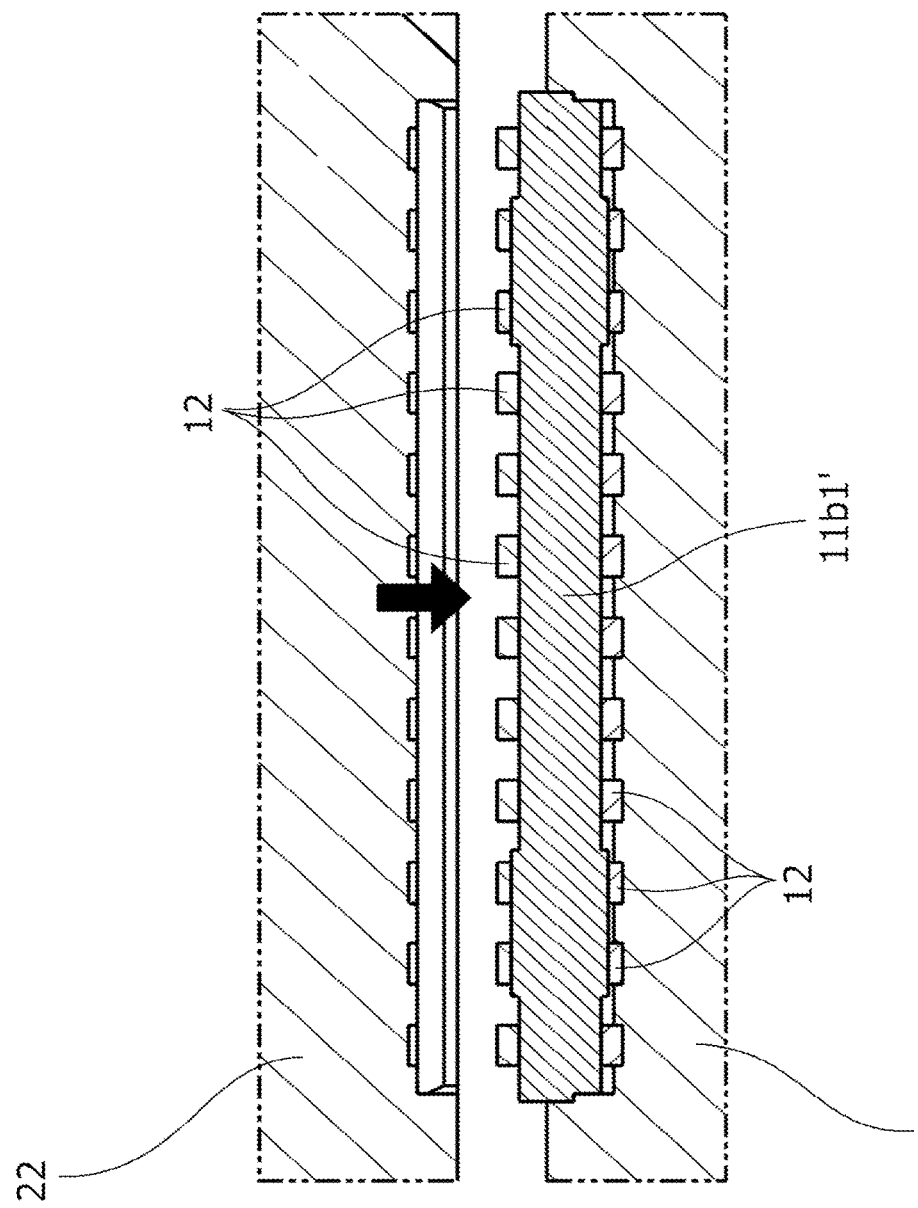
FIG. 13 is a transverse cross-sectional explanatory view showing a process of manufacturing a connector according to another embodiment of the present invention and corresponding to FIG. 12, which shows the disposition relations of the electrode portions in the molds.

On the other hand, in FIG. 13 in which the same members as those of the above described embodiment are denoted with the same reference signs, another embodiment provided with a configuration not using the ground plate (reference sign 14) of the above described embodiment is shown. A contact retainer 11b1' according to this different embodiment is not divided to the upper/lower sides like the above described embodiment, but is formed of an integrated member. On the upper/lower surfaces of the contact retainer 11b1', which is formed of the integrated member, the contact members 12 and 12 are configured to be disposed in the state in which they are vertically mutually opposed. Even according to the other embodiment provided with such a configuration, similar working/effects as those of the above described embodiment are obtained.

Hereinabove, the invention accomplished by the present inventors has been described in detail based on the embodiments. However, the present invention is not limited to the above described embodiments, and it goes without saying that various modifications can be made within the range not deviating from the gist thereof.

For example, the contact retainers in the above described embodiments are formed of the insulating resin material; however, the material of the contact retainers is not limited to the resin material, but may be rubber as long as it has insulating properties. Furthermore, in the above described embodiments, the contact retainers formed of the resin material in advance are attached to the ground plate by insert molding; however, the contact retainers may be attached by a heat-resistant tape or the like.

In the above described embodiments, the present invention is applied to USB connectors. However, the present invention can be similarly applied to other electric connectors.

The present invention can be widely applied to a wide variety of connectors used in various electric devices.

What is claimed is:

1. An electric connector comprising:
   an insulating housing;
   a metal member with opposing lateral surfaces;
   electrically-conductive contact members disposed in a mutually opposed state with the metal member in between and attached to the insulating housing; and
   contact retainers forming part of the housing and retaining the contact members by abutting the contact members, the contact retainers disposed in a contact opposed region defined as space between the mutually opposed contact members, the contact retainers disposed on both of the lateral surfaces of the metal member;
   wherein the contact retainers are disposed in a partial region of the contact opposed region; and, in another region of the contact opposed region, other part of the housing is disposed as a member different from the contact retainers, and
   wherein the contact retainers disposed respectively on the both opposing lateral surfaces of the metal member are mutually coupled through a through hole provided in the metal member.

2. The electric connector according to claim 1, wherein
   the housing has a housing main-body portion and a housing projection portion projecting from the housing main-body portion and mated with a counterpart connector;
   the contact retainer is disposed in a state that the contact retainer is retaining the contact member at a position corresponding to the housing projection portion; and
   a surface of the contact retainer retaining the contact member is a flat surface wider than the contact member.

3. The electric connector according to claim 2, wherein
   a contact auxiliary retainer retaining the contact member is disposed at a position corresponding to the housing main-body portion in the contact opposed region; and
   the contact auxiliary retainer is provided with a recessed groove capable of housing the contact member.

4. The electric connector according to claim 1, wherein the contact members are arranged in a multipolar shape.

5. The electric connector according to claim 1, wherein the contact retainers are integrally coupled by insert molding through the through hole.

6. The electric connector according to claim 1, wherein the contact opposed region becomes entirely filled when the contact retainers are mutually coupled through the through hole.

7. An electric connector comprising:
   an insulating housing;
   a metal member extending through the housing;
   electrically-conductive upper and lower contact members disposed on opposite sides of the metal member and attached to the insulating housing, the upper contact members disposed on one side of the metal member and the lower contact members disposed on an opposite side of the metal member; and
   upper and lower contact retainers forming part of the housing and retaining the contact members by abutting the contact members, the contact retainers disposed in a contact opposed region defined as space between the contact members, the upper contact retainers disposed on the one side of the metal member and the lower contact retainers disposed on the opposite side of the metal member,
   wherein the contact retainers on the opposite sides of the metal member are mutually coupled through a through hole provided in the metal member.

8. The electric connector according to claim 7, wherein the contact retainers are integrally coupled by insert molding through the through hole.

9. The electric connector according to claim 7, wherein the contact opposed region becomes entirely filled when the contact retainers are mutually coupled through the through hole.

* * * * *